July 29, 1952  M. L. EARNEST  2,605,119
SPLASH GUARD FOR VEHICLES
Filed Nov. 19, 1949  2 SHEETS—SHEET 1
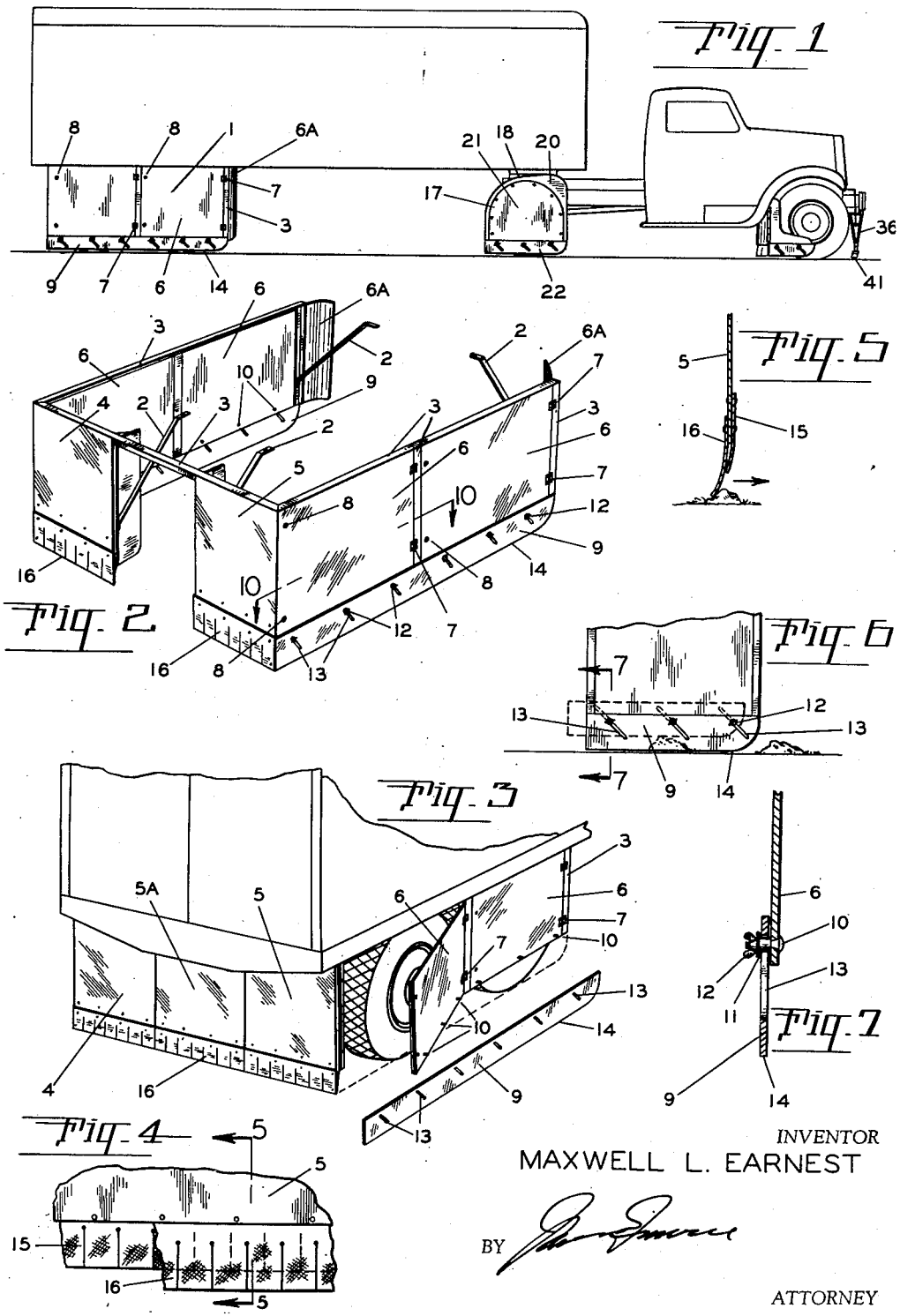
INVENTOR
MAXWELL L. EARNEST
BY
ATTORNEY July 29, 1952   M. L. EARNEST   2,605,119
SPLASH GUARD FOR VEHICLES
Filed Nov. 19, 1949   2 SHEETS—SHEET 2
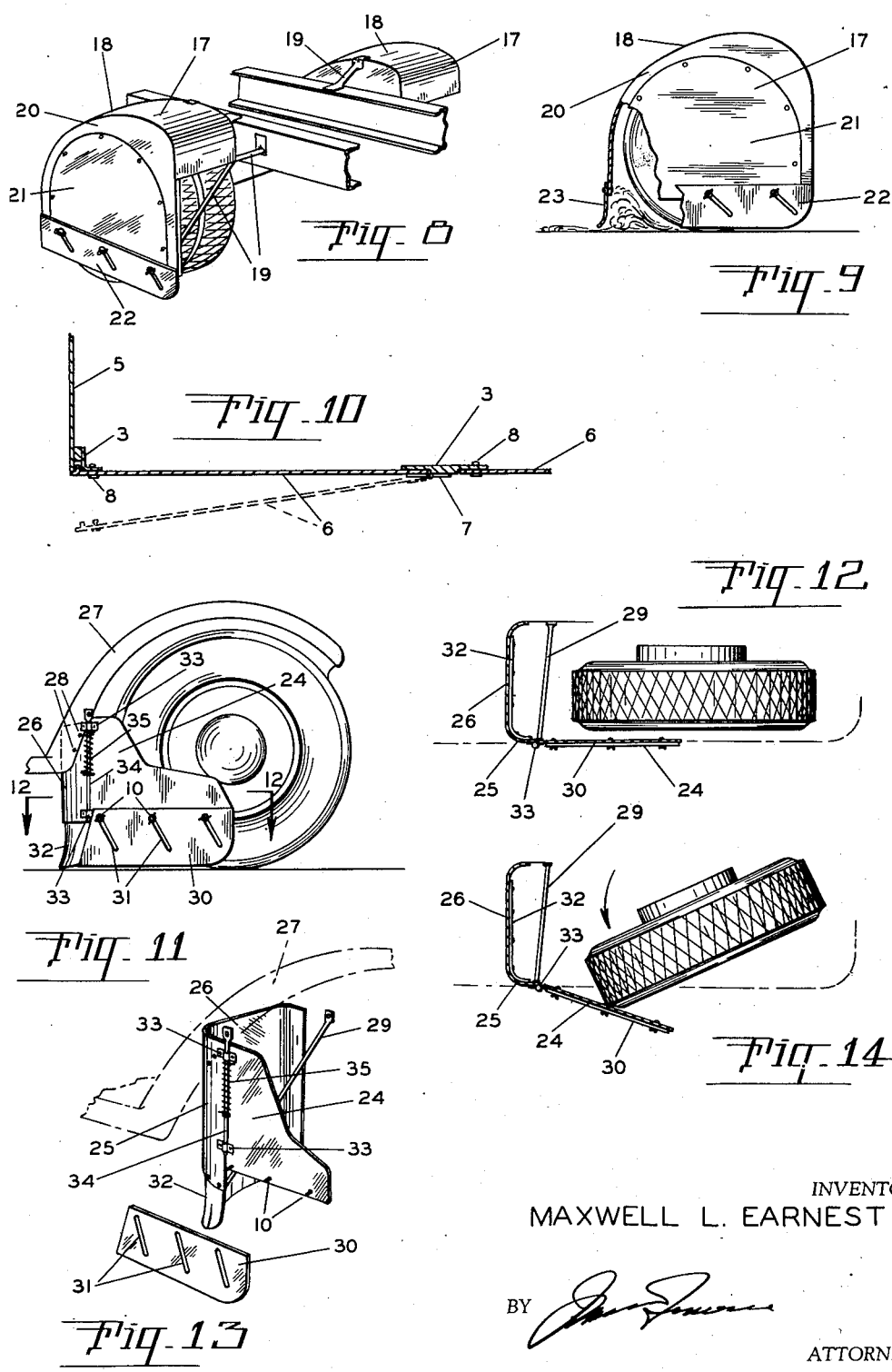
INVENTOR
MAXWELL L. EARNEST
BY
ATTORNEY Patented July 29, 1952

2,605,119

UNITED STATES PATENT OFFICE 2,605,119

SPLASH GUARD FOR VEHICLES

Maxwell L. Earnest, Portland, Oreg.

Application November 19, 1949, Serial No. 128,281

2 Claims. (Cl. 280—153)

This invention relates to splash guards and is particularly adapted to large trucks.

The primary object of the invention is to prevent the wheels of the truck from throwing mud and water against passing or on-coming vehicles. In order to prevent mud and water from splashing in heavy rains, I have found that by enclosing the wheels within special splash guards that the splashing of mud and water is reduced to a minimum.

A further object of the invention is to design and mount splash guards over the wheels that will pass over obstacles without injurying the said guards.

Another object of the invention is to provide means of permitting the front wheels to be turned within the guards.

These and other incidental objects will be apparent in the drawings, specification and claims.

Referring to the drawings:

Figure 1 is a conventional truck having my new and improved splash guards mounted thereon, together with the swipe for removing the water from in front of the wheels.

Figure 2 is a perspective view of the splash guards adapted to fit over the rear dual wheels of the truck.

Figure 3 illustrates the same mounted to the truck, illustrating how the same may be opened up for changing tires.

Figure 4 is a detail fragmentary view looking into the rear of the splash guard illustrating how the rear wall is constructed in order to pass over obstructions on the highway.

Figure 5 is a sectional view, taken on line 5—5 of Figure 4, further illustrating this structure.

Figure 6 is a detail fragmentary view of one of the guards for the single wheels.

Figure 7 is a sectional view, taken on line 7—7 of Figure 6.

Figure 8 illustrates how the guards are placed over the single wheels of the truck.

Figure 9 is a side view of the same, partially broken away for convenience of illustration.

Figure 10 is a detail fragmentary plan view taken on line 10—10 of Figure 2, illustrating the structure of the guard for permitting the tires to be worked upon.

Figure 11 is a side view of the front wheel of the truck illustrating the detail of this guard.

Figure 12 is a plan sectional view of the guard taken on line 12—12 of Figure 11.

Figure 13 is a perspective detail view of the guard partially disassembled for convenience of illustration.

Figure 14 is the same as Figure 12, except that the wheel is shown turning while the guard permits the same to do so.

Referring more specifically to the drawings:

I will first describe the method of covering dual wheels or the guard indicated by numeral 1. The guard is mounted to the frame of the truck by way of the braces 2, placed at proper and convenient locations relative to the guard. The guard has a framework 3 adapted to be secured to the body of the truck by the said bracing.

The guard consists of permanent rear walls 4 and 5, secured to the frame 3 by any suitable means. The sides of the guards are indicated by numeral 6. These sides are hingedly secured to the frame 3 by suitable hinges 7 at their one edge and adapted to be secured to the frame 3 by suitable fastening screws 8 at their opposite edge. The object of the hinged side walls of the guards is to permit the operator to have access to the tires of the truck.

Additional side guards are mounted to the lower edges of the side walls 6 by means of bolts 10 being secured to the side walls by way of spacers 11 and locking wing nuts 12. Slots 13 are formed in the guard 9 and are adapted to work freely over the spacers 11 so that in the event the lower edge 14 of the guard strikes an obstruction, the guard will be permitted to raise as best illustrated in Figure 6. This is one of the outstanding features of my invention.

Slitted strips 15 and 16 are secured to the lower edge of the rear walls 4, 5 and 5A. The slits of these strips are offset from one another so that they will bridge one another, preventing leaking or splashing therethrough but will pass over obstructions, as best indicated in Figure 5. The rear guard panel 5A is so designed that access can be had to the axles of the truck, best indicated in Figure 2. Additional flexible guards 6A are secured to the forward edge of the frame 3 and prevent splashing out through the front of the guard assembly.

The guard assembly 17, covering the single wheels of the rear of the truck, is constructed as best illustrated in Figures 8 and 9. These guards resemble fenders as indicated at 18 and are secured to the frame of the truck by the brackets or braces 19. The outer wall 20 of the guard has an opening therethrough which is covered by a cover plate 21, which is removable permitting access to the wheels. The guard 22 is constructed and mounted in the same manner as the guard 9 is mounted to the rear splash guard assembly just described.

The rear of the fender 18 has a slitted guard 23 secured thereto for permitting the guard to travel over obstructions. The front wheel guard assemblies are indicated in Figures 11, 12, 13 and 14. They consist of a side guard 24 being bent around the corner 25 into the rear guard portion 26. This guard is secured to the truck fender 27 and 28 and has suitable braces 29 for further securing the same to the vehicle.

A movable side plate 30 is secured by the bolts 10 to the side guard 24. The guard having slots 31 is adapted to fit over the spacers or shoulders 11 of the bolt assembly 10, permitting the same to rise over obstructions. A slitted strip 32 extends down from the rear of the rear guard 26 for contacting the road surface and permitting the unit to pass over obstacles.

The side guard 24 is hingedly secured at 33 to the rear guard 26 by way of the rod 34, which has a spring 35 associated therewith continuously forcing the side guard 24 to the position illustrated in Figures 11, 12 and 13. Referring to Figure 14, when the front wheel is turned it will force the side guard to pivot about the rod 34 allowing the wheel to work within the guard on the turn.

What I claim is:

1. A splash guard for vehicle wheels comprising a frame, means to secure the frame to a vehicle, side members hinged to the frame, rear members on the frame, one of the rear members being removable, and flaps on the bottom of the side and rear members, the flaps on the side frames having inclined slots, and pins extending from the side members and projecting through the slots to mount said flaps on said side members.

2. A splash guard as defined in claim 1, wherein the front of the frame is open and vertical end fenders are secured to the forward side ends of the frame.

MAXWELL L. EARNEST.

REFERENCES CITED

The following references are of record in the file of this patent:

UNITED STATES PATENTS

| Number | Name | Date |
|---|---|---|
| 1,147,256 | Marion | July 20, 1915 |
| 1,266,866 | Scognamillo | May 21, 1918 |
| 1,295,034 | Hughes | Feb. 18, 1919 |
| 1,567,777 | Wampach | Dec. 29, 1925 |
| 1,805,933 | Victor | May 19, 1931 |
| 2,038,265 | Bradley | Apr. 21, 1936 |
| 2,157,793 | Lang | May 9, 1939 |

FOREIGN PATENTS

| Number | Country | Date |
|---|---|---|
| 51,912 | Denmark | July 20, 1936 |
| 607,009 | France | Mar. 20, 1926 |